(12) United States Patent
Shimoto et al.

(10) Patent No.: US 9,230,597 B2
(45) Date of Patent: Jan. 5, 2016

(54) MAGNETIC HEAD HAVING A SPIN TORQUE OSCILLATOR (STO) WITH A HYBRID HEUSLER FIELD GENERATION LAYER (FGL)

(71) Applicant: HGST Netherlands B.V., Amsterdam (NL)

(72) Inventors: Masato Shimoto, Odawara (JP); Keiichi Nagasaka, Isehara (JP); Masato Matsubara, Yokohama (JP); Yo Sato, Odawara (JP)

(73) Assignee: HGST Netherlands B.V., Amsterdam (NL)

( * ) Notice: Subject to any disclaimer, the term of this patent is extended or adjusted under 35 U.S.C. 154(b) by 34 days.

(21) Appl. No.: 14/070,401

(22) Filed: Nov. 1, 2013

(65) Prior Publication Data

US 2015/0124347 A1     May 7, 2015

(51) Int. Cl.
   *G11B 5/127* (2006.01)
   *G11B 23/00* (2006.01)
   *G11B 5/31* (2006.01)
   *G11B 5/00* (2006.01)

(52) U.S. Cl.
   CPC .......... *G11B 23/0057* (2013.01); *G11B 5/1278* (2013.01); *G11B 5/314* (2013.01); *G11B 5/3146* (2013.01); *G11B 2005/0024* (2013.01)

(58) Field of Classification Search
   CPC ............. G11B 2005/0024; G11B 5/3146; G11B 5/1278; G11B 5/314; G11B 2005/0005; G11B 5/3906
   USPC ....................................... 360/125.3
   See application file for complete search history.

(56) References Cited

U.S. PATENT DOCUMENTS

| | | | |
|---|---|---|---|
| 7,616,412 B2 * | 11/2009 | Zhu et al. | 360/324.2 |
| 8,064,244 B2 * | 11/2011 | Zhang et al. | 365/158 |
| 8,208,219 B2 * | 6/2012 | Zhang et al. | 360/125.03 |
| 8,300,356 B2 | 10/2012 | Zhang et al. | |

(Continued)

FOREIGN PATENT DOCUMENTS

JP        2013065385 A       4/2013

OTHER PUBLICATIONS

Matsubara et al., "Experimental feasibility of spin-torque oscillator with synthetic field generation layer for microwave assisted magnetic recording," Journal of Applied Physics, vol. 109, No. 7, 2011, pp. 1-3 (abstract only).

(Continued)

*Primary Examiner* — Brian Miller
(74) *Attorney, Agent, or Firm* — Zilka-Kotab, PC

(57) ABSTRACT

In one embodiment, a magnetic head includes a main pole configured to write data to a magnetic medium, a trailing shield positioned on a trailing side of the main pole, and a STO between the main pole and the trailing shield, wherein the STO includes a laminated structure having a FGL, a spun polarization layer (SPL), and a non-magnetic spacer positioned between the FGL and the SPL, wherein the FGL includes a laminated structure having one or more layers of a CoFe alloy and a Heusler alloy alternately laminated in this order from an end of the FGL closest to the non-magnetic spacer. In another embodiment, a method is presented for forming such a magnetic head utilizing a FGL that includes a laminated structure baying layers of a CoFe alloy and a Heusler alloy alternately laminated in this order from an end of the FGL closest to the non-magnetic spacer.

19 Claims, 15 Drawing Sheets

(56) References Cited

U.S. PATENT DOCUMENTS

| | | | |
|---|---|---|---|
| 8,305,711 B2 | 11/2012 | Li et al. | |
| 8,345,380 B2 | 1/2013 | Sato et al. | |
| 8,446,698 B2* | 5/2013 | Fuji et al. | 360/313 |
| 8,467,149 B2* | 6/2013 | Takeo et al. | 360/125.3 |
| 8,582,225 B2* | 11/2013 | Shiimoto et al. | 360/59 |
| 8,614,861 B1* | 12/2013 | Tomoda et al. | 360/125.3 |
| 8,817,419 B2* | 8/2014 | Oikawa et al. | 360/125.3 |
| 8,824,104 B1* | 9/2014 | Koui et al. | 360/125.3 |
| 8,830,627 B2* | 9/2014 | Sugiura et al. | 360/125.3 |
| 8,879,206 B2* | 11/2014 | Shimizu et al. | 360/125.3 |
| 8,929,031 B2* | 1/2015 | Takeo et al. | 360/125.3 |
| 2012/0002331 A1* | 1/2012 | Oikawa et al. | 360/328 |
| 2013/0050866 A1 | 2/2013 | Matsubara et al. | |
| 2013/0070367 A1 | 3/2013 | Igarashi et al. | |
| 2013/0082787 A1 | 4/2013 | Zhang et al. | |
| 2013/0083423 A1 | 4/2013 | Shiroishi et al. | |
| 2013/0271866 A1* | 10/2013 | Sato | 360/71 |
| 2013/0279039 A1* | 10/2013 | Shiroishi | 360/48 |
| 2013/0279046 A1* | 10/2013 | Iwasaki et al. | 360/244 |
| 2013/0302649 A1* | 11/2013 | Takahashi et al. | 428/811.3 |
| 2013/0316088 A1* | 11/2013 | Fujita et al. | 427/526 |
| 2014/0104724 A1* | 4/2014 | Shiroishi et al. | 360/75 |
| 2014/0146420 A1* | 5/2014 | Shimizu et al. | 360/234.7 |
| 2014/0160598 A1* | 6/2014 | Takashita et al. | 360/234.3 |

OTHER PUBLICATIONS

Zhu et al., "Microwave Assisted Magnetic Recording," IEEE Transactions on Magnetics, vol. 44, No. 1, Jan. 2008, pp. 125-131 (abstract only).

Slonczewski, J. C., "Current-driven excitation of magnetic multilayers," Journal of Magnetism and Magnetic Materials, vol. 159, 1996, pp. L1-L7.

Monsma et al., "Spin polarization of tunneling current from ferromagnet/interfaces using copper doped aluminum superconducting films," Applied Physics Letter, vol. 77, No. 720, 2000, (abstract only).

Varaprasad et al., "Spin polarization and Gilbert damping of Co2Fe (GaxGe1-x) Heusler alloys," Acta Materialia, vol. 60, No. 18, 2012, pp. 6257-6265 (abstract only).

* cited by examiner

MAGNETIC HEAD HAVING A SPIN TORQUE OSCILLATOR (STO) WITH A HYBRID HEUSLER FIELD GENERATION LAYER (FGL)

FIELD OF THE INVENTION

The present invention relates to magnetic data recording, and more particularly, this invention relates to a magnetic head having a spin torque oscillator (STO) with a hybrid Heusler field generation layer (FGL).

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, HDDs have been desired to store more information in its limited area and volume. A technical approach to this desire is to increase the capacity by increasing the recording density of the HDD. To achieve higher recording density, it is useful to increase the quality of the magnetization transition which determines the signal-to-noise ratio (SNR) of the bit information stored to the magnetic medium. In order to achieve this with conventional techniques, a write bubble that is faster than the transition speed of the recording medium is generated. Therefore, many attempts have been made to shorten a magnetic circuit length for a magnetic head in order to further improve the high frequency properties.

Microwave-assisted magnetic recording (MAMR) has been researched for use as a recording method for improving surface magnetic recording density of magnetic media. In MAMR, a magnetic field is exerted by a main pole which applies an alternating current (AC) field from a spin-torque oscillator (STO) to a medium. Applying an AC field to a medium reduces the coercivity of the medium, which facilitates high-quality recording. Therefore, for MAMR to be more efficient, an STO which generates a sufficiently large AC field should be developed. With a STO structure as described in IEEE Transactions on Magnetics, Vol. 44, No. 1, January 2008 or J. Appl. Phys. 109, 07B741 (2011), and as shown in FIG. 1 according to the prior art, the STO 100 comprises a FGL 102 for generating an AC field, a spacer 104, and a spin polarization layer (SPL) 106 for transmitting spin-polarized torque. The SPL comprises a material having strong vertical anisotropy energy. The STO is also charged by a current from the SPL toward the FGL. During this charging, a spin torque oriented in the same direction as the magnetization of the FGL acts on the magnetization of the SPL, and a spin torque oriented in an antiparallel direction to the magnetization of the SPL acts on the magnetization of the FGL. The STO also comprises a cap layer 112 positioned above the FGL 102 and an underlayer positioned below the SPL 106. The STO is positioned between the main pole 108 and the trailing shield 110.

Spin torques are described in detail in J. C. Slonczewski, J. Magn. Magn. Mater. 159, L1, 1996. Because a perpendicular field is applied to the STO, the magnetization of the SPL is stable vertically. The magnetization of the FGL, however, oscillates while having a large in-plane component. Oscillation of the STO in this structure is called T-mode oscillation because the SPL and the FGL oscillate in a T-shape.

A different STO structure is described in Japanese Unexamined Patent Publication No. 2013-65385, Application No. 2011-204843. With this structure, as shown in FIG. 2 according to the prior art, the STO 200 comprises a FGL 102 for generating an AC field, a spacer 104, and a SPL 106 for transmitting a spin-polarized torque. The differences between the STO 100 in FIG. 1 and STO 200 in FIG. 2 are that the magnetization of the SPL 106 is effectively oriented in the in-plane direction of the film, and both the FGL 102 and the SPL 106 in STO 200 oscillate. Specifically, a current is charged from the FGL toward the SPL, and a structure is used in which the SPL has a thin film thickness and a low vertical anisotropy field such that the anisotropy field of the SPL is effectively zero. This structure inverts quickly because inversion of the magnetization of the SPL is not delayed by switching the polarity of the write head field, which is useful in high-speed transfer recording. Oscillation of the STO 200 is called AF-mode oscillation because the SPL and the FGL oscillate while maintaining an antiparallel state.

A feature demanded of an STO is improvement in the generated AC field, which may be accomplished by increasing the spin torque acting on the FGL. Since the size of the spin torque is inversely proportional to the density of the current to the STO, increasing the application current obtains a higher AC field strength. FIG. 3 shows a relationship between AC field strength and application current in an STO structure using CoFe, while FIG. 4 shows a state of magnetization of the FGL and the SPL, as viewed from a side opposite the medium, when the charging current is 4 mA, 8 mA, and 18 mA.

The state of magnetization is a result of a micromagnetic simulation numerical calculation. FIG. 3 reveals that increasing the current charging the STO increases AC field strength, but too high a charging current attenuates AC field strength. As suggested by the state of FGL magnetization in FIG. 4, a major contributor to increasing AC field strength is a large in-plane component of FGL magnetization near the spacer boundary with the FGL. At greater distances from the spacer boundary with the FGL, however, FGL magnetization is greater in a direction perpendicular to the surface of the film, which contributes little to improving AC field strength. This is because the spin torque acting on the FGL is strongest near the spacer boundary, and becomes weaker as the distance from the spacer boundary increases. Because applying more charging current to the STO produces too high a spin torque near the spacer boundary with the FGL, FGL magnetization is disordered and develops multi domains, while there is little increase in the film surface component of FGL magnetization at greater distances from the spacer boundary. As a result, too strong of a STO current attenuates the AC field strength.

SUMMARY

In one embodiment, a magnetic head includes a main pole configured to write data to a magnetic medium using a magnetic field, a trailing shield positioned on a trailing side of the main pole in a down-track direction, and a spin torque oscillator (STO) between the main pole and the trailing shield, wherein the STO includes a laminated structure having a field generation layer (FGL), a spin polarization layer (SPL), and a non-magnetic spacer positioned between the FGL and the SPL, wherein the FGL includes a laminated structure having one or more layers of a CoFe alloy and a Heusler alloy alternately laminated in this order from an end of the FGL closest to the non-magnetic spacer.

In another embodiment, a method for forming a magnetic head includes forming a main pole configured to write data to a magnetic medium using a magnetic field, forming a SPL above the main pole, forming a non-magnetic spacer above the SPL, forming a FGL above the non-magnetic spacer, the FGL including a laminated structure that includes one or more layers of a CoFe alloy and a Heusler alloy alternately laminated in this order from an end of the FGL closest to the non-magnetic spacer, wherein the SPL, non-magnetic spacer, and FGL together form a STO, and forming a trailing shield above the STO.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

In order to overcome deficiencies of prior art spin torque oscillator (STO) designs, a strength of an alternating current (AC) field generated by the STO may be improved by equalizing a size of the spin torque in the field generation layer (FGL). Making the size of the spin torque uniform which is acting in the FGL of the STO may provide a higher AC field strength.

In one general embodiment, a magnetic head includes a main pole configured to write data to a magnetic medium using a magnetic field, a trailing shield positioned on a trailing side of the main pole in a down-track direction, and a STO between the main pole and the trailing shield, wherein the STO includes a laminated structure having a FGL, a spin polarization layer (SPL), and a non-magnetic spacer positioned between the FGL and the SPL, wherein the FGL includes a laminated structure having one or more layers of a CoFe alloy and a Heusler alloy alternately laminated in this order from an end of the FGL closest to the non-magnetic spacer.

In another general embodiment, a method for forming a magnetic head includes forming a main pole configured to write data to a magnetic medium using a magnetic field, forming a SPL above the main pole, forming a non-magnetic spacer above the SPL, forming a FGL above the non-magnetic spacer, the FGL including a laminated structure that includes one or more layers of a CoFe alloy and a Heusler alloy alternately laminated in this order from an end of the FGL closest to the non-magnetic spacer, wherein the SPL non-magnetic spacer, and FGL together form a STO, and forming a trailing shield above the STO.

Figure 1:
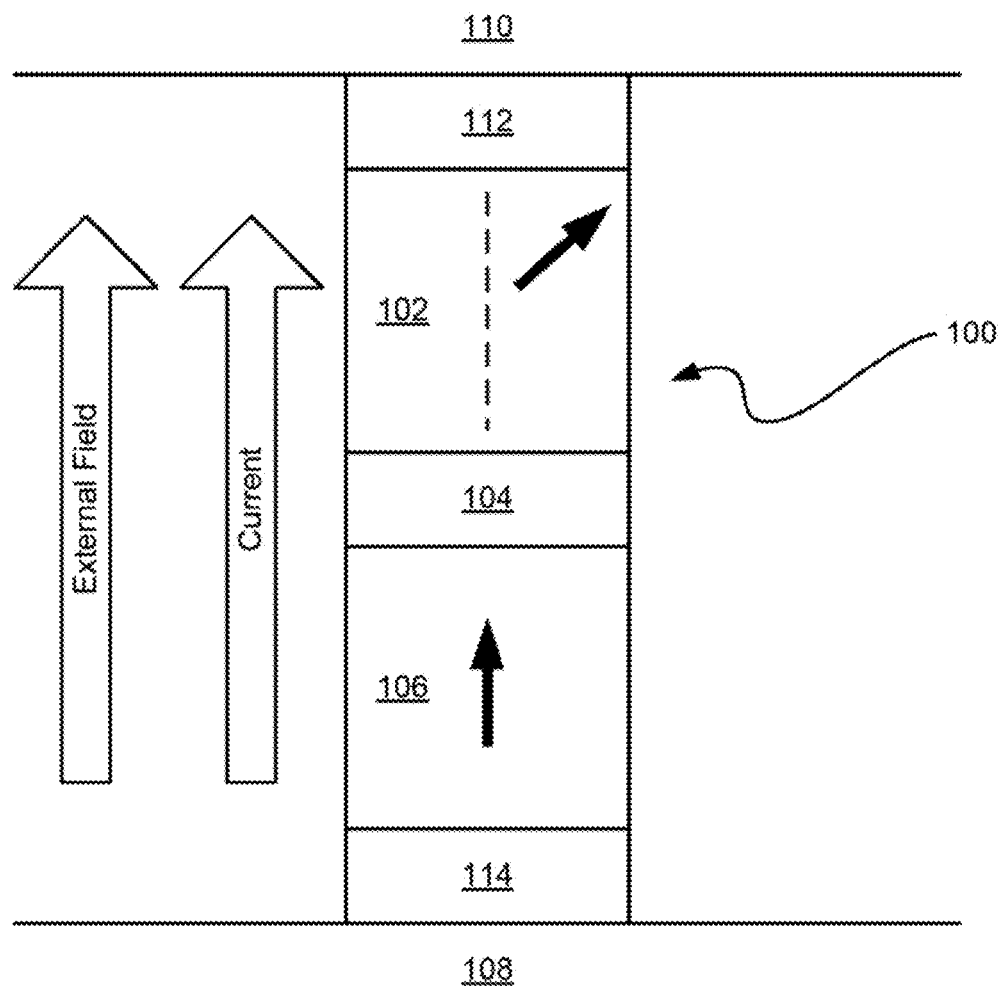
FIG. 1 shows a T-mode spin torque oscillator (STO) structure, according to the prior art.
Figure 2:
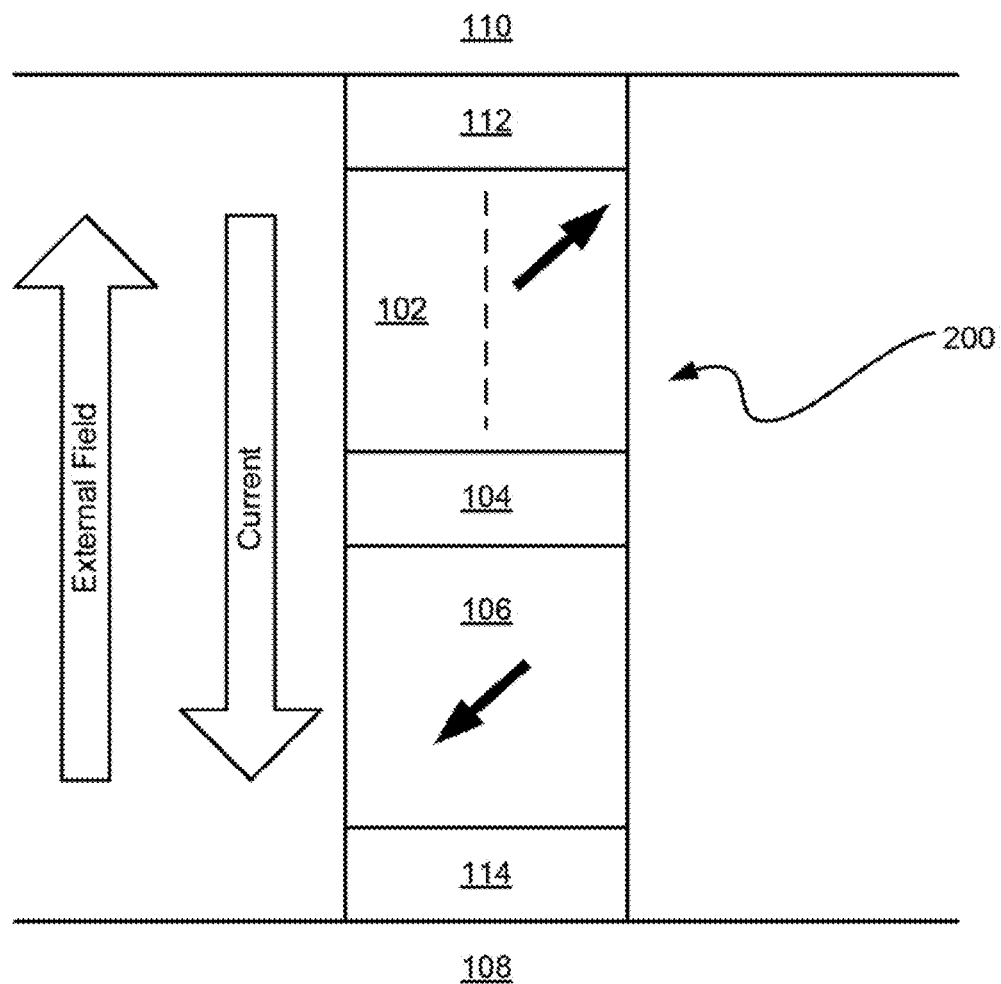
FIG. 2 shows an AF-mode STO structure, according to the prior art.
Figure 3:
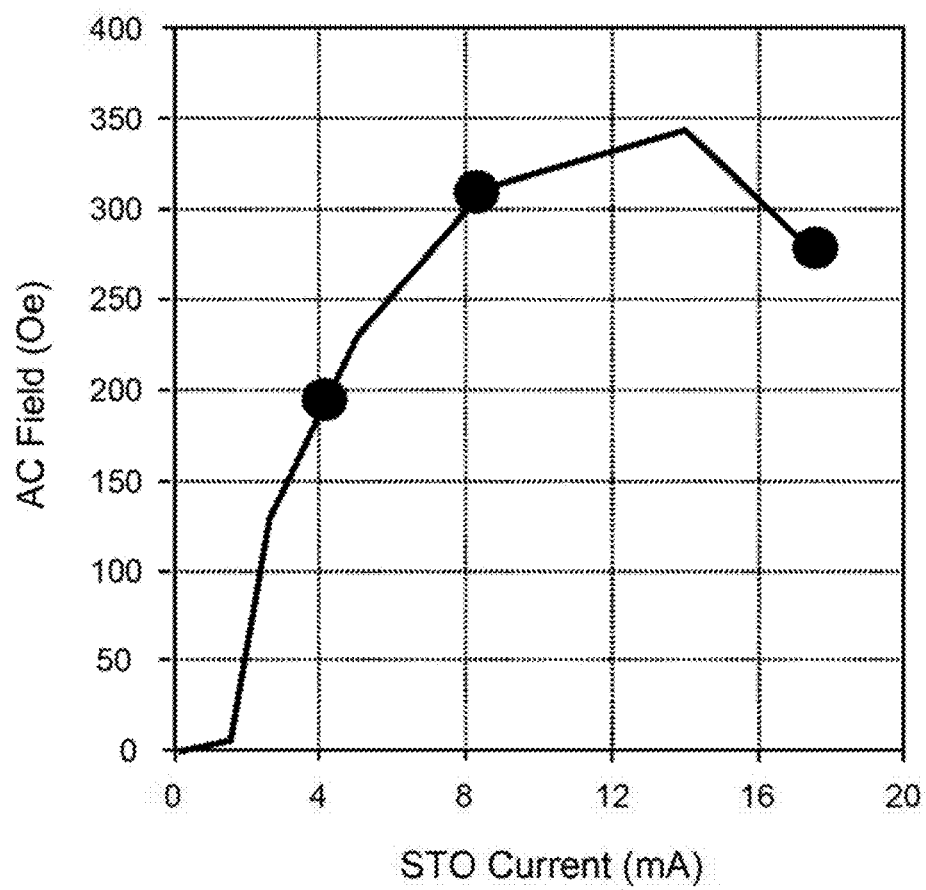
FIG. 3 shows a plot of an alternating current (AC) field versus STO current for a conventional STO, according to the prior art.
Figure 4:
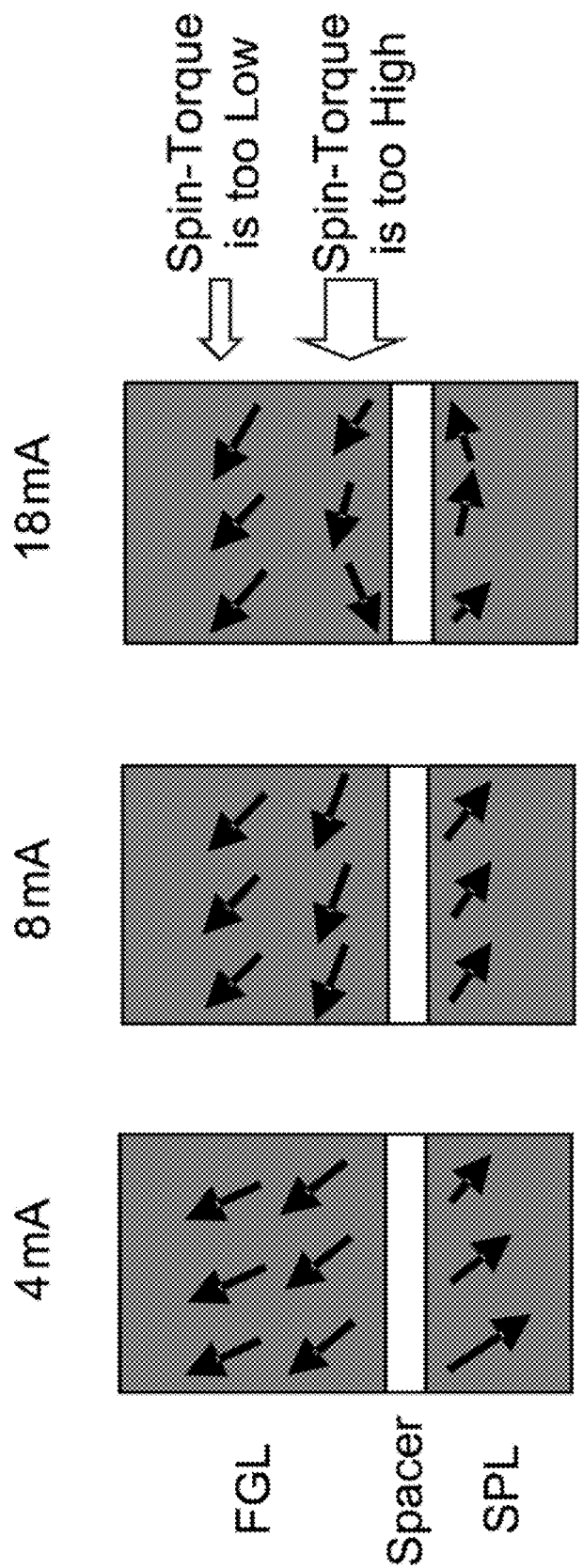
FIG. 4 shows magnetization configuration for a conventional STO at different STO currents of 4 mA, 8 mA, and 18 mA, according to the prior art.
Figure 5A:
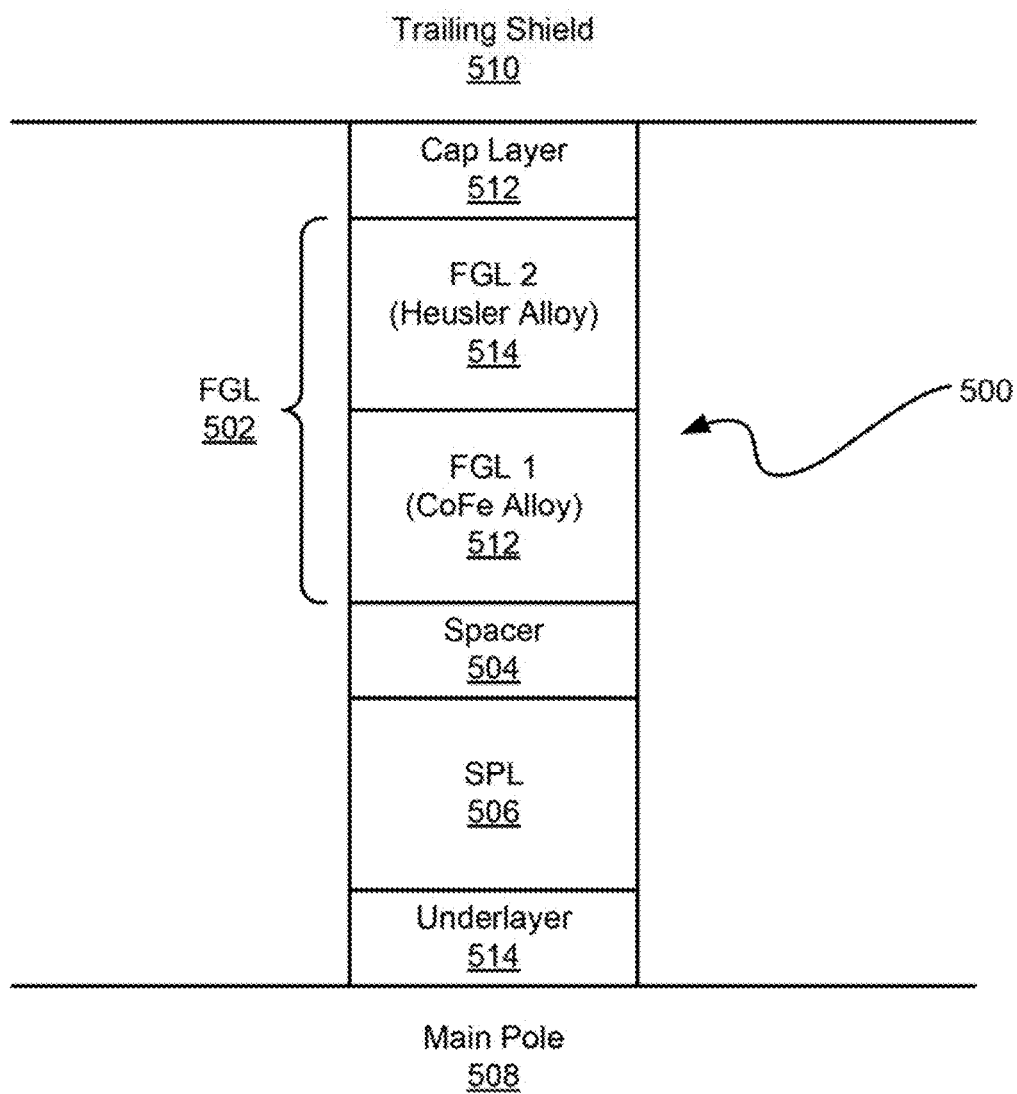
FIG. 5A shows an STO structure according to one embodiment (Hybrid A).

FIG. 5 shows a schematic view of a STO 500 according to one embodiment. The STO 500 is positioned between the main pole 508 and the trailing shield 510 of a magnetic head, but structural parts other than the STO 500 have been omitted for clarity. The STO 500 comprises a spin polarization layer (SPL) 506 which is a magnetic layer, a nonmagnetic spacer 504, and a FGL 502 which is a magnetic layer. The STO 500 effectively has a plane of easy magnetization along the film surface. The materials of the FGL 502 according to one embodiment satisfy the following two requirements.

First, the FGL 502 is laminated which includes at least one first magnetic layer (FGL 1) 512, which may comprise a CoFe alloy 512, and at least one Heusler layer (FGL 2) 514 which may comprise a Heusler alloy, in this order, from a spacer 504 side thereof (an end of the FGL 502 closest to the non-magnetic spacer 504, which when no layers are positioned therebetween, may be referred to as a spacer boundary). The Heusler alloy 514 may comprise any suitable material known in the art to have a spin polarizability of about 0.55 or greater. Furthermore, the Heusler alloy 514 may comprise $Co_2YZ$ (where Y may be any of Mn, Fe, Cr, and combinations thereof, and Z may be any of Ga, Ge, Al, Si, Sn, Cr, Ti, and combinations thereof). In more specific embodiments, the CoFe alloy 512 may comprise any of the materials shown in Table 1 among others, while the Heusler alloy 514 may comprise any of the materials shown in Table 2 among others. This embodiment is represented as the Hybrid A structure in Table 3.

TABLE 1

Materials for the CoFe Alloy

| Material | P | Ms (T) |
|---|---|---|
| Co | 0.42 | 1.7 |
| $Co_{84}Fe_{16}$ | 0.52 | 2.0 |
| $Co_{60}Fe_{40}$ | 0.50 | 2.3 |
| $Co_{50}Fe_{50}$ | 0.45 | 2.3 |
| $Co_{40}Fe_{60}$ | 0.51 | 2.4 |
| Fe | 0.45 | 2.2 |

TABLE 2

Materials for the Heusler Alloy

| Material | P | Ms (T) | Material | P | Ms (T) |
|---|---|---|---|---|---|
| $Co_2Mn(Ge_{0.75}Ga_{0.25})$ | 0.74 | 1.1 | $Co_2Mn(Al_{0.5}Si_{0.5})$ | 0.60 | 1.1 |
| $Co_2Mn(Ga_{0.5}Sn_{0.5})$ | 0.72 | 1.1 | $Co_2Fe(Ga_{0.5}Si_{0.5})$ | 0.60 | 1.3 |
| $Co_2Fe(Si_{0.75}Ge_{0.25})$ | 0.70 | 1.4 | $Co_2Fe(Al_{0.5}Si_{0.5})$ | 0.60 | 1.3 |
| $Co_2Fe(Ga_{0.5}Ge_{0.25})$ | 0.69 | 1.3 | $Co_2CrAl$ | 0.62 | 0.72 |
| $Co_2(Cr_{0.02}Fe_{0.98})Ga$ | 0.67 | 1.2 | $CO_2CrGa$ | 0.61 | 0.72 |
| $Co_2Mn(Ge_{0.25}Sn_{0.75})$ | 0.67 | 1.2 | $Co_2MnSn$ | 0.60 | 1.2 |
| $Co_2(Mn_{0.95}Fe_{0.05})Sn$ | 0.65 | 1.2 | $Co_2MnAl$ | 0.56 | 0.96 |
| $(Co_{1.93}Fe_{0.062})MnGe$ | 0.68 | 1.2 | $Co_2MnGa$ | 0.60 | 0.96 |
| $Co_2(Mn_{0.5}Fe_{0.5})Ga$ | 0.70 | 1.1 | $Co_2FeSi$ | 0.60 | 1.4 |

TABLE 2-continued

Materials for the Heusler Alloy

| Material | P | Ms (T) | Material | P | Ms (T) |
|---|---|---|---|---|---|
| $Co_2(Cr_{0.02}Fe_{0.98})Si$ | 0.65 | 1.4 | $Co_2FeAl$ | 0.56 | 1.2 |
| $Co_2Mn(Ti_{0.25}Sn_{0.75})$ | 0.64 | 1.2 | $Co_2MnGe$ | 0.60 | 1.2 |
| $Co_2Mn(Al_{0.5}Sn_{0.5})$ | 0.63 | 1.1 | $Co_2FeGe$ | 0.58 | 1.4 |
| $Co_2Mn(Ga_{0.25}Si_{0.75})$ | 0.63 | 1.1 | $Co_2FeGa$ | 0.59 | 1.2 |
| $Co_2Mn(Si_{0.25}Ge_{0.75})$ | 0.63 | 1.2 | $Co_2TiSn$ | 0.57 | 0.48 |
| $Co_2(Mn_{0.5}Fe_{0.5})Si$ | 0.61 | 1.3 | $Co_2MnSi$ | 0.55 | 1.2 |

Figure 5B:
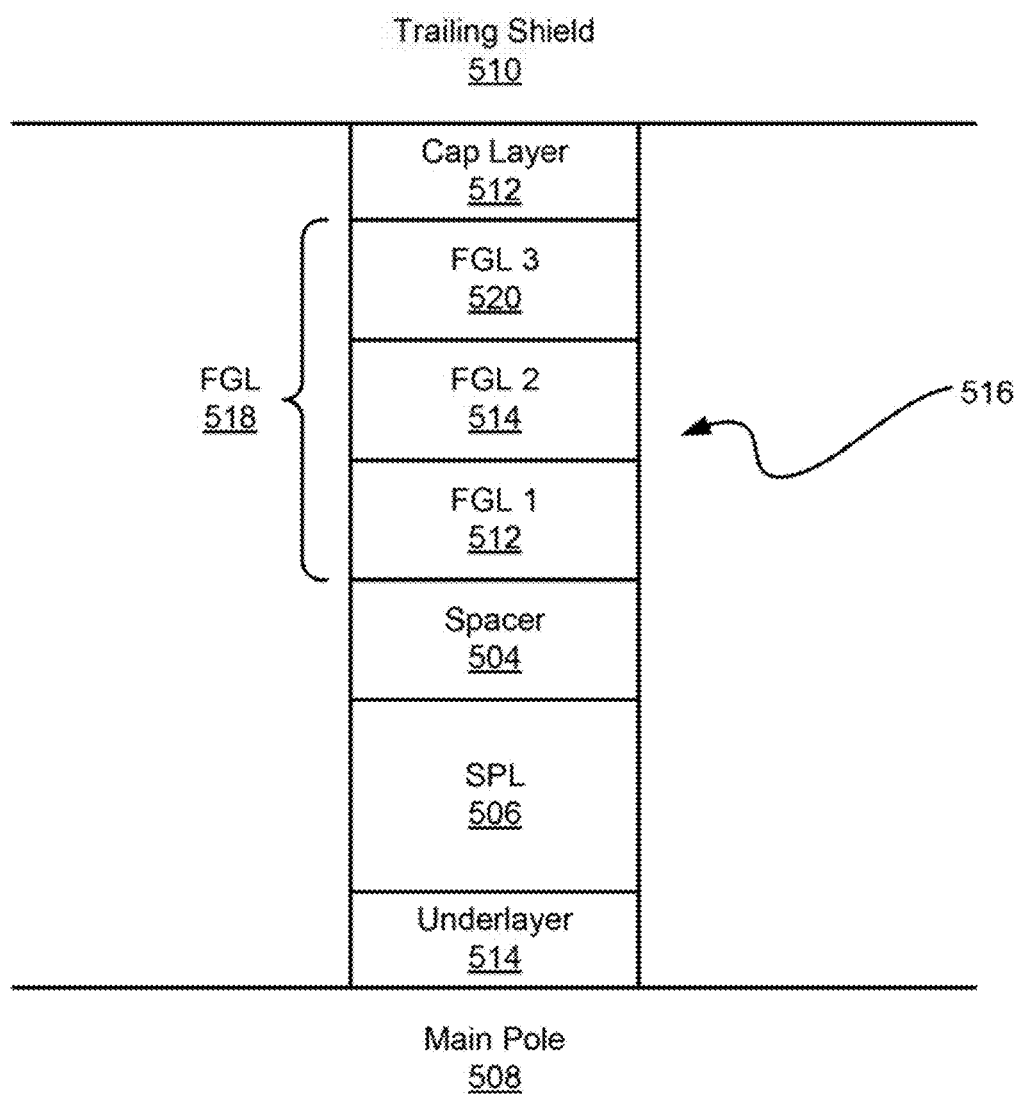
FIG. 5B shows an STO structure according to another embodiment (Hybrid I).

In another embodiment, as shown in FIG. 5B, a STO 516 may comprise a FGL 518 which includes a laminated structure comprising a first CoFe alloy (FGL 1) 512, a Heusler alloy (FGL 2) 514, and a second CoFe alloy (FGL 3) 520, which are laminated in this order from the end of the FGL 502 closest to the spacer 504. This embodiment is represented as the Hybrid I structure in Table 3.

Figure 5C:
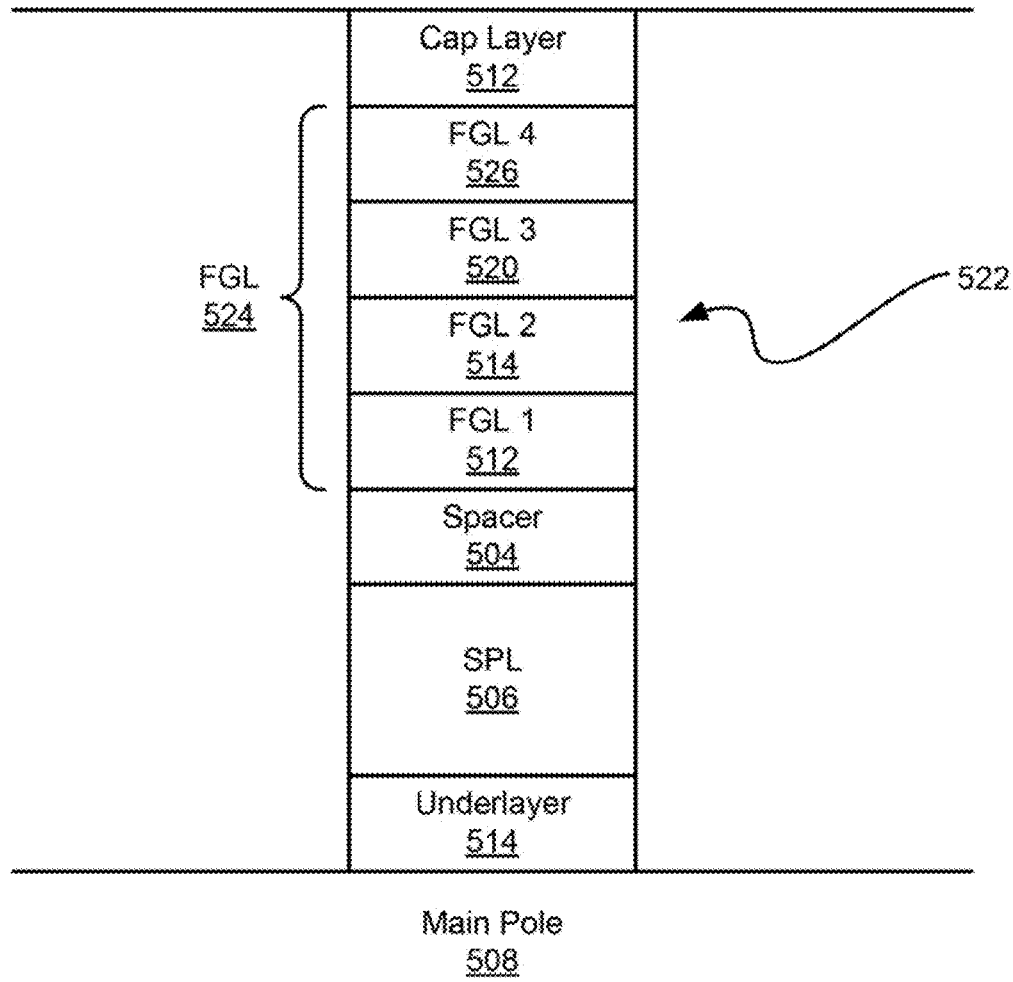
FIG. 5C shows an STO structure according to yet another embodiment (Hybrid J).

According to yet another embodiment, as shown in FIG. 5C, a STO 522 may comprise a FGL 524 which includes a laminated structure comprising a first CoFe alloy (FGL 1) 512, a first Heusler alloy (FGL 2) 514, a second CoFe alloy (FGL 3) 520, and a second Heusler alloy (FGL 4) 526 which are laminated in this order from the end of the FGL 502 closest to the spacer 504. In this embodiment, the Heusler alloy layer 526 is positioned at a greater distance from the spacer 504 beyond the CoFe alloy layer 520. This embodiment is represented as the Hybrid J structure in Table 3.

Of course, any number of CoFe alloys and Heusler alloys may be laminated in alternating order as would be understood by one of skill in the art upon reading the present descriptions.

Figure 6:
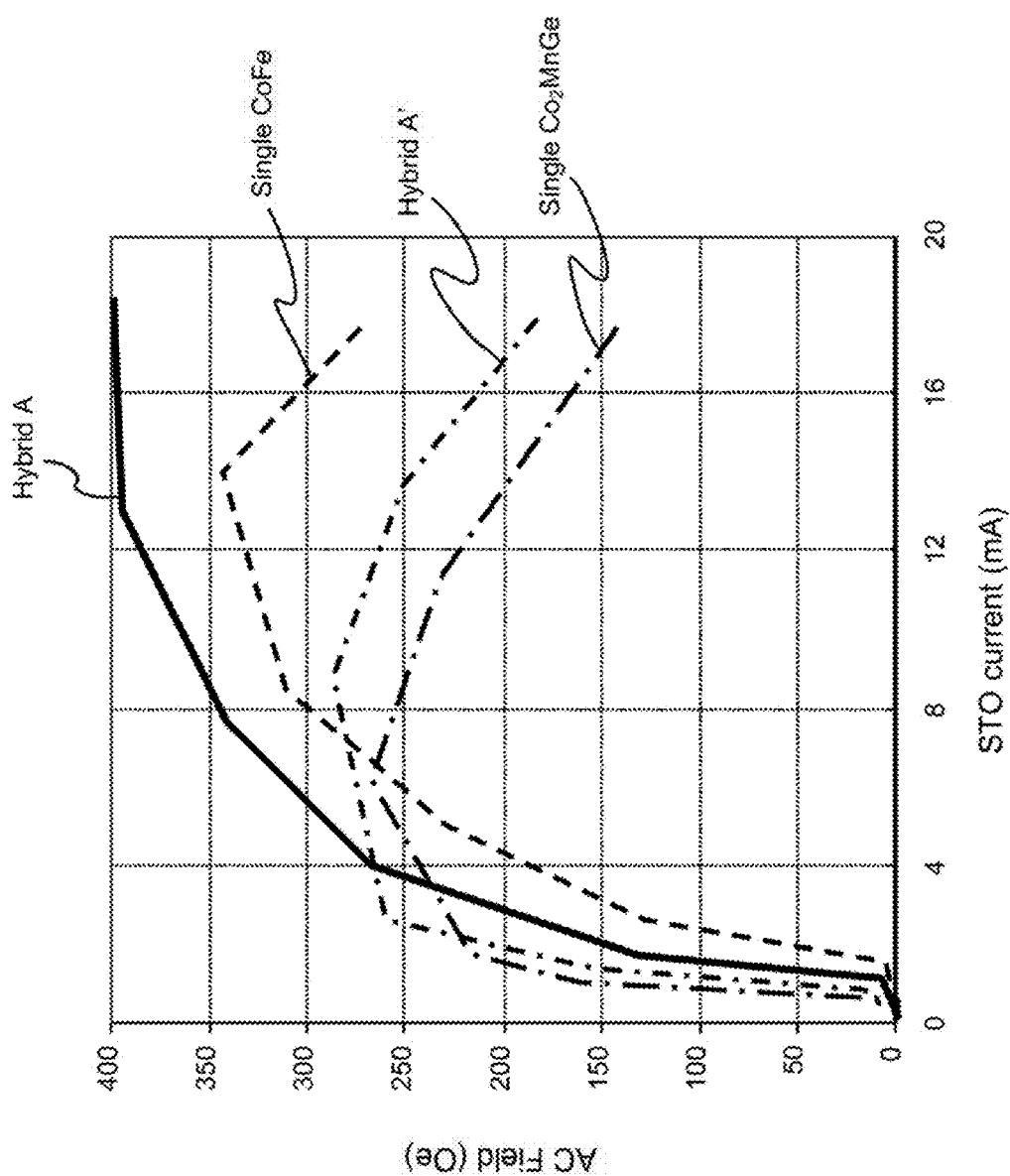
FIG. 6 shows a plot of an AC field versus STO current for STO structures according to various embodiments.

One effect that results from using a STO as described herein according to various embodiments is an improvement in the AC field, which is described in more detail with reference to FIGS. 6-7. Various structures were produced in order to study their properties, and the results of the studies are shown in Table 3. Table 3 shows different combinations of FGL materials and AC field strength when the STO current is 10 mA, with each structure produced being given a descriptive name, such as Single A, Hybrid B, etc. These names do not have any meaning beyond being a way to reference the structures.

TABLE 3

| | FGL materials | | | | |
|---|---|---|---|---|---|
| Structure | FGL 1 | FGL 2 | FGL 3 | FGL 4 | AC Field |
| Single A | $Co_{50}Fe_{50}$ (10 nm) | | | | 325 Oe |
| Single B | $Co_2MnGe$ (10 nm) | | | | 245 Oe |
| Hybrid A | $Co_{50}Fe_{50}$ (6 nm) | $Co_2MnGe$ (4 nm) | | | 365 Oe |
| Hybrid A' | CosMnGe (4 am) | $Co_{50}Fe_{50}$ (6 nm) | | | 270 Oe |
| Hybrid B | $Co_{50}Fe_{50}$ (6 nm) | $Co_2MnSn$ (4 nm) | | | 365 Oe |
| Hybrid C | $Co_{50}Fe_{50}$ (6 nm) | $Co_2MnAl_{0.5}Sn_{0.5}$ (4 nm) | | | 365 Oe |
| Hybrid D | $Co_{50}Fe_{50}$ (6 nm) | $Co_2Cr_{0.5}Fe_{0.5}Si$ (4 nm) | | | 375 Oe |
| Hybrid E | $Co_{50}Fe_{50}$ (6 nm) | $CO_2Mn_{0.95}Fe_{0.5}Sn$ (4 nm) | | | 375 Oe |
| Hybrid F | $Co_{50}Fe_{50}$ (6 nm) | $Co_2Cr_{0.4}Fe_{0.6}Al$ (4 nm) | | | 350 Oe |
| Hybrid G | $Co_{50}Fe_{50}$ (5 nm) | $Co_2MnGe$ (5 nm) | | | 355 Oe |
| Hybrid H | $Co_{50}Fe_{50}$ (4 nm) | $Co_2MnGe$ (6 nm) | | | 340 Oe |

TABLE 3-continued

FGL materials

| Structure | FGL 1 | FGL 2 | FGL 3 | FGL 4 | AC Field |
|---|---|---|---|---|---|
| Hybrid I | $Co_{50}Fe_{50}$ (3 nm) | $Co_2MnGe$ (4 nm) | $Co_{50}Fe_{50}$ (3 nm) | | 375 Oe |
| Hybrid J | $Co_{50}Fe_{50}$ (3 nm) | $Co_2MnGe$ (2 nm) | $Co_{50}Fe_{50}$ (3 nm) | $Co_2MnGe$ (2 nm) | 390 Oe |

FGL 1 in Table 3 is the FGL that is positioned closest to the end of the FGL closest to the spacer in the STO stack, FGL 2 is the next layer positioned above FGL 1 further away from the end of the FGL closest to the spacer, FGL 3 is the next layer above FGL 2 positioned even further from the end of the FGL closest to the spacer, etc. In effect, each increase in FGL number indicates one more layer away from the spacer.

The FGL materials in Hybrid A form a structure in which $Co_{50}Fe_{50}$ having a film thickness of about 6 nm and $Co_2MnGe$ having a film thickness of about 4 nm are laminated in this order from the end of the FGL closest to the spacer. FIG. 6 shows that the Hybrid A structure, according to one embodiment, generates an AC field by a lower current than a single-layer of CoFe, and achieves a higher AC field strength than a single-layer of CoFe when a large current is applied. When the Hybrid A structure is compared with a single-layer of $Co_2MnGe$, however, the Hybrid A structure generates an AC field by a current that is about 2 mA higher, but the achieved AC field strength is about 150 Oe higher. Also, when compared to the Hybrid A' structure in which the upper and lower FGL of the Hybrid A structure are switched, the Hybrid A structure has a slightly higher AC field start-up current, but the achieved AC field strength is about 150 Oe higher. Therefore, the Hybrid A structure can realize the highest achieved AC field strength.

Figure 7:
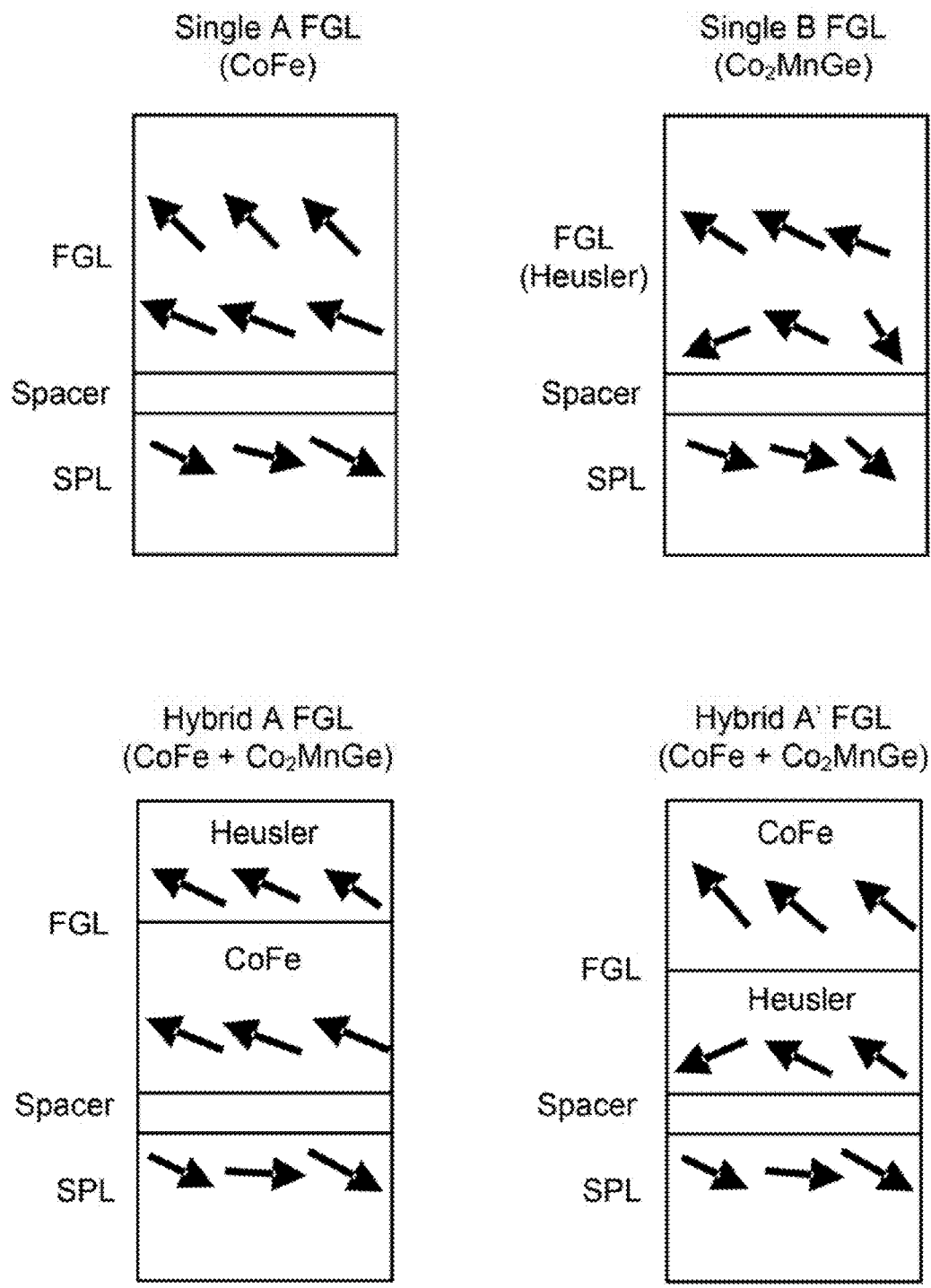
FIG. 7 shows magnetization configurations for STO structures according to various embodiments at a STO current of 8 mA, according to one embodiment.

As shown in FIG. 7, one reason for this is believed to be because FGL magnetization in the Hybrid A structure is oriented in the film surface almost uniformly inside the FGL. This uniformity of magnetization inside the FGL may be explained by considering the distribution of the size of the spin torque acting inside the FGL. The size of the spin torque acting inside the FGL is known to increase as the spin polarizability of the FGL materials increases and saturation magnetization decreases, and to attenuate at greater distance from the spacer, as taught by J. C. Slonczewski, Magn. Magn. Mater. 159, L1, 1996. As shown in Tables 1 and 2, a Heusler alloy has higher polarizability and less saturation magnetization than a CoFe alloy, according to Appl. Phys. Lett., Vol. 77, No. 5, p 720 (2000), and B. S. D. Ch. S Varaprasad et al., Acta Materialia 60 (2012) 6257-6265, among other references.

Therefore, the Heusler alloy layer acts more strongly on spin torque. Therefore, a Single B structure (a single-layer Heusler alloy) may generate an AC field by a smaller current that a Single A structure (a single-layer CoFe alloy). The Single B structure, however, has little increase in the AC field even when the STO current is increased, and thus is incapable of obtaining a high AC field, because the FGL has less saturation magnetization and the FGL magnetization near the spacer tends to deteriorate into multiple domains. The Hybrid A' structure which employs a Heusler alloy above the CoFe alloy in the FGL, is capable of increasing FGL magnetization of the FGL more than the Single B structure, but does not obtain a high AC field strength because spin torque is low at greater distances from the spacer regardless of the tendency to produce multiple domains on the spacer-side of the FGL.

The Hybrid A structure, however, is a good working example, according to one embodiment. The Hybrid A structure has spin torque of uniform size inside the FGL and a highly uniform in-plane component of the magnetization of the FGL, and thus obtains a high AC field strength by using a CoFe alloy having high spin torque efficiency on the spacer-side of the FGL, where spin torque is less attenuated, and a Heusler alloy having low spin torque efficiency at a greater distance from the end of the FGL closest to the spacer, where spin torque is more attenuated.

Figure 8:
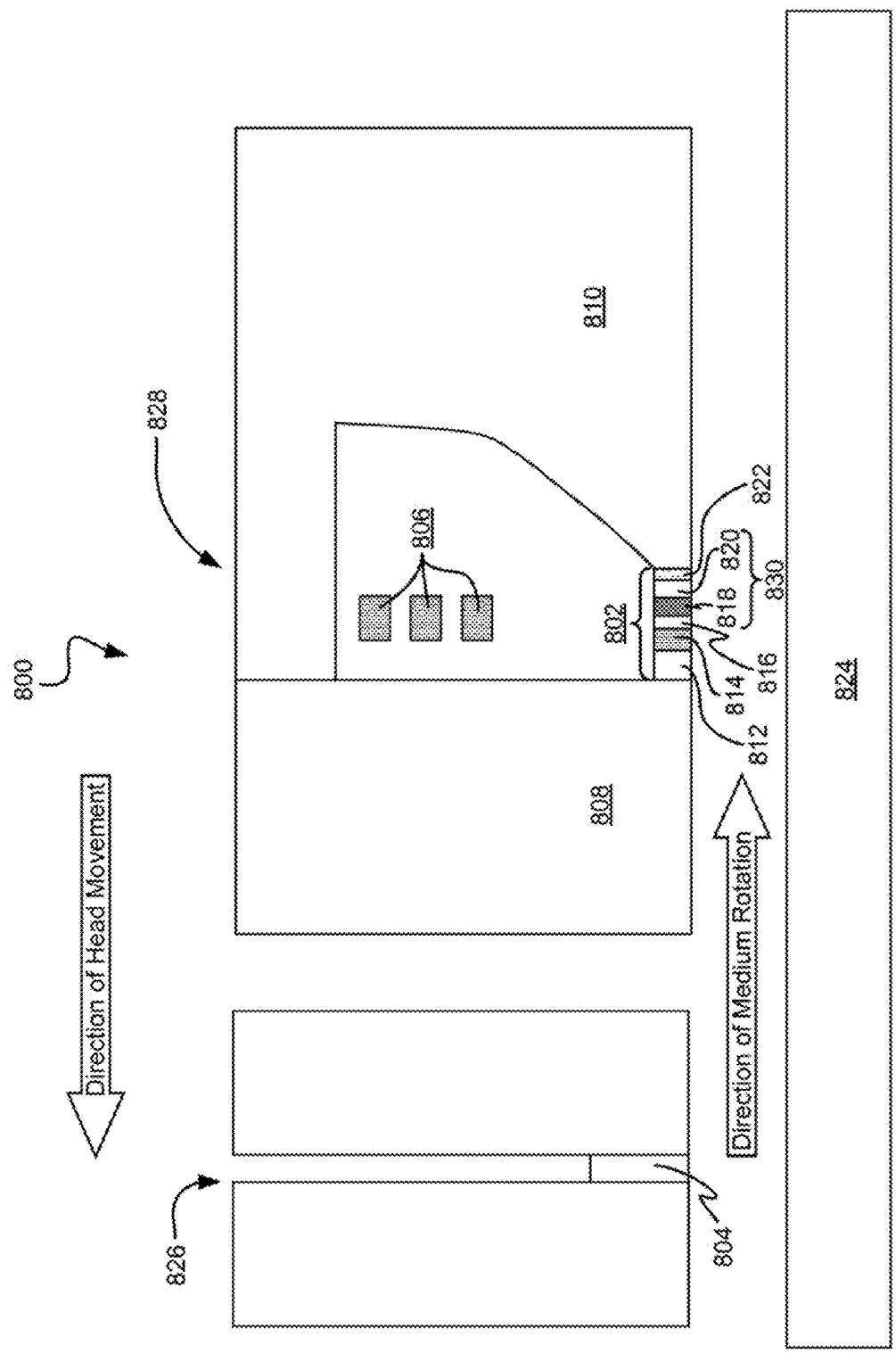
FIG. 8 is a schematic diagram of a portion of a microwave-assisted magnetic recording (MAMR) head according to one embodiment.

With reference to FIG. 8, which shows a detailed view of a portion of a magnetic head 800 according to one embodiment. The magnetic head 800 includes a write head (writer) 828 and a read head (reader) 826. The read head 826 is configured to read information from a magnetic recording medium 824 and comprises a read sensor 804 of a type known in the art.

The write head 828 comprises a STO 802 for generating an AC field, a main pole 808 for generating a writing magnetic field, a coil 806 for exciting a magnetic field in the main pole 808, and a trailing shield 810. Although not shown in FIG. 8 due to orientation of the figure, a side shield may be provided on sides of the main pole 808 in a track width direction (into and out of the paper). Although not a part of the structure, a magnetic recording medium 824 is shown in the figure for reference. The structure of the STO 802 is the same as that shown in FIG. 5; however, any embodiment described herein may be used in conjunction with the magnetic head 800 shown in FIG. 8. Furthermore, any materials described for use with a FGL 830 according to Hybrid A as shown in Table 3 may be used, among others.

Although none of the described layers are necessarily limited to the embodiments described hereafter, as any suitable materials, structures, and orientations may be used in the context of FIG. 8, in this example, the STO 802 comprises an underlayer 812, an SPL 814, a nonmagnetic spacer 816, an FGL 830 which comprises a CoFe alloy layer 818 and a Heusler alloy layer 820, and a cap layer 822 in this order from the main pole 808 side thereof.

In one non-limiting example, the underlayer 812 way comprise Ta having a thickness in a range from about 0.5 nm to about 5 nm, such as about 2 nm, the cap layer 822 may comprise Cr having a thickness in a range from about 0.5 nm to about 5 nm, such as about 2 nm, and the nonmagnetic spacer 816 may comprise Cu having a thickness in a range from about 2 nm to about 6 nm, such as about 3 nm. The underlayer 812, the cap layer 822, and the nonmagnetic spacer 816 may be conductive nonmagnetic materials, which may comprise individual metals such as Ta, Cr, Cu, Pt, Ag, Rh, Ru, etc., or a laminated structure of one or more of the metals. Furthermore, film thicknesses may be set so as to obtain high characteristics of the magnetic head 800 as would be understood by one of skill in the art.

The track width and the element height of the STO 802 may both be in a range from about 20 nm to about 60 nm, such as about 40 nm, although each may be individually set and are not necessarily equal. The main pole 808, in one example, may comprise a CoFe alloy having an Ms of about 2.4 T, a track width of about 60 nm, and a film thickness of about 300 nm. The trailing shield is a NiFe alloy having an Ms of 1.2T. The geometrical dimensions of these STO and recording head parts are not specifically limited, and may be designed arbitrarily so as to obtain high field strength and a high field gradient from the STO and the recording head.

Furthermore, the FGL 830 may comprise a laminate of a CoFe alloy layer 818 comprising $Co_{50}Fe_{50}$ having a thickness in a range from about 4 nm to about 8 nm, such as about 6 nm, and a Heusler alloy layer 820 comprising $Co_2MnSe$ having a thickness in a range from about 2 nm to about 6 nm, such as about 4 nm. The layers are oriented in this order from the end of the FGL 830 closest to the spacer 816 (the spacer boundary when no layers are positioned therebetween).

In place of these materials and thicknesses, the FGL 830 may be selected from any of the embodiments described in Table 3, among others. Specifically, the CoFe alloy layer 818 may be chosen from the materials shown in Table 1, and the Heusler alloy layer 820 may be chosen from the materials shown in Table 2. For the Heusler alloy layer 820, a material with high spin polarizability (P) and saturation magnetization (Ms) may, in principle, generate a higher AC field. Although the film thicknesses of the CoFe alloy layer 818 and the Heusler alloy layer 820 may also be selected to optimize performance of the had 800, the film thickness of the CoFe alloy layer 818 may be restricted to a range from 0.8 to 2.0 times the film thickness of the Heusler alloy layer 820 in order to maintain uniformity of the size of the spin torque inside the FGL 830 and high FGL magnetization. Table 3 shows Hybrids B, C, D, E, F, G, and H, which are structural examples which may used other than Hybrid A. These structural examples differ only in the materials and film thicknesses of the FGL 830, and all obtain the AC field improving effects described herein. Hybrids I and J in Table 3 use a different number of marinated layers to form the FGL in each structure.

Figure 9:
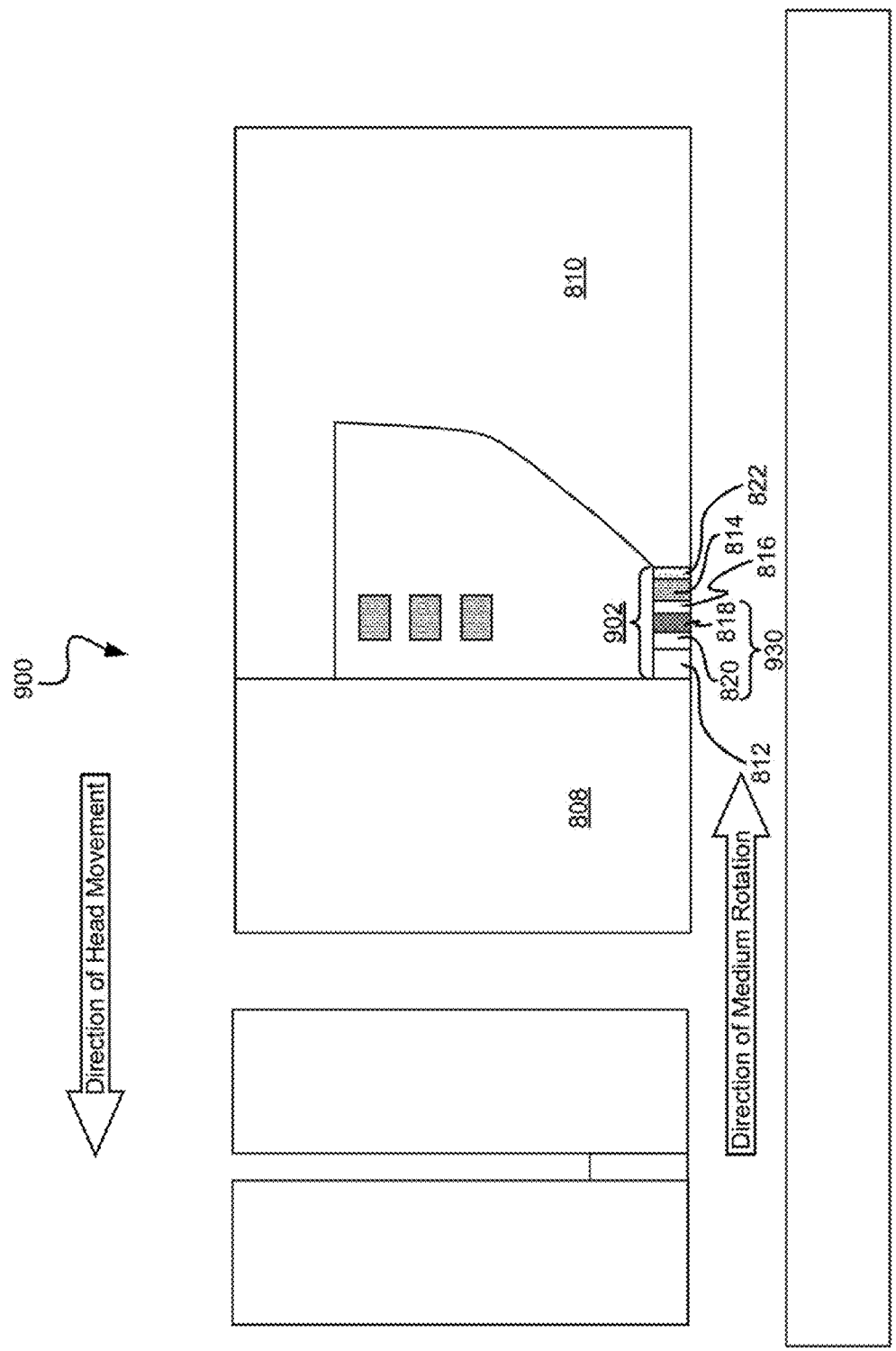
FIG. 9 is a schematic diagram of a portion of a MAMR head according to another embodiment.

FIG. 9 shows another example of a magnetic head 900 having a STO 902 with another structure, according to one embodiment. The difference between STO 902 and the STO 802 in FIG. 8 is that the laminating order of the SPL 814, the spacer 816, and the FGL 930 (which includes the Heusler alloy layer 820 and CoFe alloy layer 818) of the STO 902 in FIG. 9 is reversed. All other components are the same. Because the lamination order inside the FGL 930 in both structures comprises a CoFe alloy and a Heusler alloy in this order from the end of the FGL 930 closest to the spacer 816, the AC field is improved with both structures equivalently. However, the FGL 930 in FIG. 9 may he brought closer to the main pole 808, which helps to improve the effective recording field, by applying an AC field in a location having high recording field strength.

Figure 10:
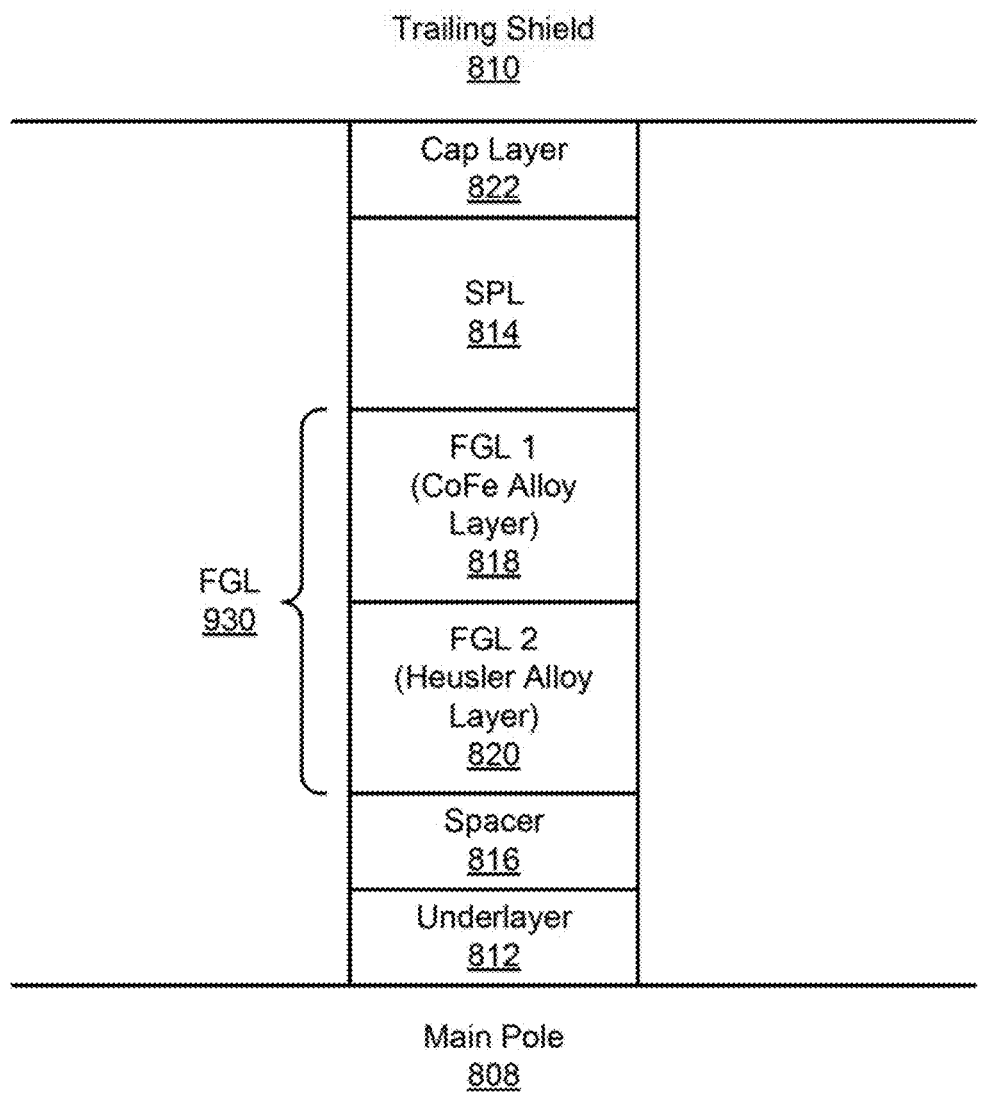
FIG. 10 shows an STO structure according to one embodiment (Hybrid A').

FIG. 10 shows a detailed view from a media-facing surface of the magnetic head 900 in FIG. 9, according to one embodiment. As can be seen, the lamination order of the FGL 930 is switched as compared to the lamination order for the FGL 830 in FIG. 8. Specifically, in FIG. 10, it can be seen that the underlayer 812 is formed closest to the main pole 808, followed by a Heusler alloy layer (FGL 2) 820 and a CoFe alloy layer (FGL 1) 818 which comprise the FGL 930, a spacer 816, the SPL 814, and the cap layer 822.

Figure 11:
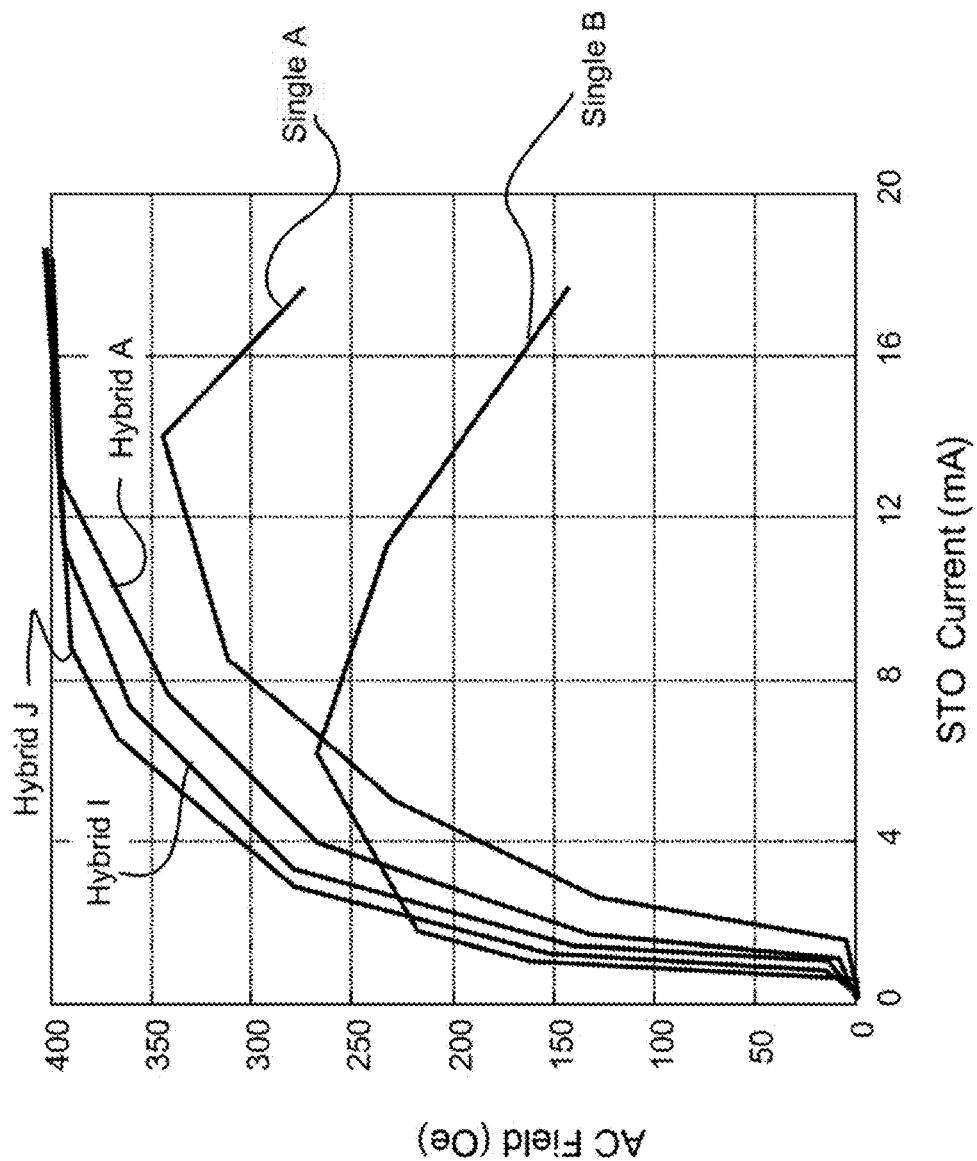
FIG. 11 shows a plot of an AC field versus STO current for STO structures according to various embodiments.

FIG. 11 shows the dependency of AC field strength on the STO current in a structure utilizing a STO having a structure according to Hybrids A, I, and J, along with comparisons of Single A and Single B structures. A STO having a structure according to Hybrid I may improve the uniformity of the magnetization inside the FGL more than one utilizing the Hybrid A structure, and may obtain high AC field strength. Furthermore, a STO having a structure according to Hybrid J may improve the uniformity of the magnetization inside the FGL more than one utilizing the Hybrid A or Hybrid I structures.

Figure 12:
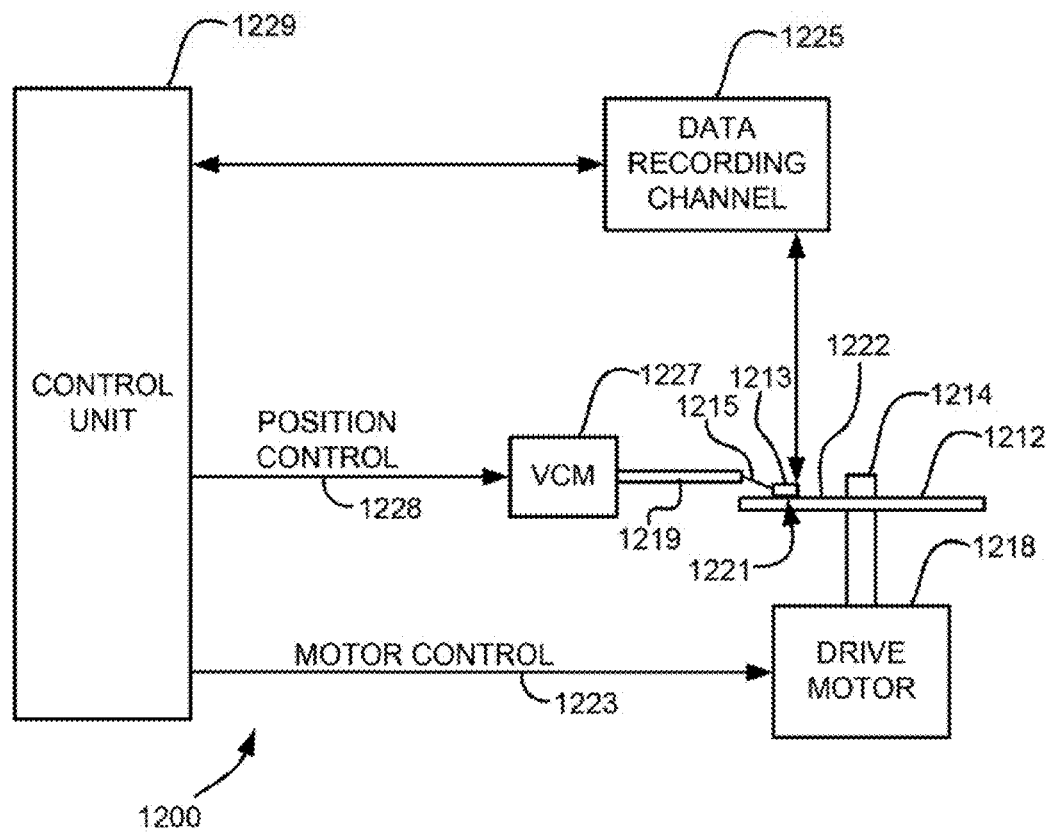
FIG. 12 shows a simplified drawing of a magnetic recording disk drive system according to one embodiment.

Referring now to FIG. 12, there is shown a disk drive 1200 in accordance with one embodiment of the present invention. As shown in FIG. 12, at least one rotatable magnetic medium (e.g., magnetic disk) 1212 is supported on a spindle 1214 and rotated by a drive mechanism, which may include a disk drive motor 1218. The magnetic recording on each disk is typically in the form of an annular pattern of concentric data tracks (not shown) on the disk 1212. Thus, the disk drive motor 1218 preferably passes the magnetic disk 1212 over the magnetic read/write portions 1221, described immediately below.

At least one slider 1213 is positioned near the disk 1212, each slider 1213 supporting one or more magnetic read/write portions 1221, e.g., of a magnetic head according to any of the approaches described and/or suggested herein. As the disk rotates, slider 1213 is moved radially in and out over disk surface 122 so that portions 121 may access different tracks of the disk where desired data are recorded and/or to be written. Each slider 1213 is attached to an actuator arm 1219 by means of a suspension 1215. The suspension 1215 provides a slight spring force which biases slider 1213 against the disk surface 1222. Each actuator arm 1219 is attached to an actuator 1227. The actuator 1227 as shown in FIG. 12 may be a voice coil motor (VCM). The VCM comprises a coil movable within a fixed magnetic field, the direction and speed of the coil movements being controlled by the motor current signals supplied by controller 1229.

During operation of the disk storage system, the rotation of disk 1212 generates an air bearing between slider 1213 and disk surface 1222 which exerts an upward force or lift on the slider. The air bearing thus counter-balances the slight spring force of suspension 1215 and supports slider 1213 off and slightly above the disk surface by a small, substantially constant spacing during normal operation. Note that in some embodiments, the slider 1213 may slide along the disk surface 1222.

The various components of the disk storage system are controlled in operation by control signals generated by controller 1229, such as access control signals and internal clock signals. Typically, control unit 1229 comprises logic control circuits, storage (e.g., memory), and a microprocessor. In a preferred approach, the control unit 1229 is electrically coupled (e.g., via wire, cable, line, etc.) to the one or more magnetic read/write portions 1221, for controlling operation thereof. The control unit 1229 generates control signals to control various system operations such as drive motor control signals on line 1223 and head position and seek control signals on line 1228. The control signals on line 1228 provide the desired current profiles to optimally move and position slider 1213 to the desired data track on disk 1212. Read and write signals are communicated to and from read/write portions 1221 by way of recording channel 1225.

The above description of a typical magnetic disk storage system, and the accompanying illustration of FIG. 12 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write portion includes a coil layer embedded in one or more insulation layers (insulation stack), the insulation stack being located between first and second pole piece layers. A gap is formed between the first and second pole piece layers by a gap layer (possibly at a media-facing surface or air bearing surface (ABS) of the write portion in one embodiment). The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

Figure 13:
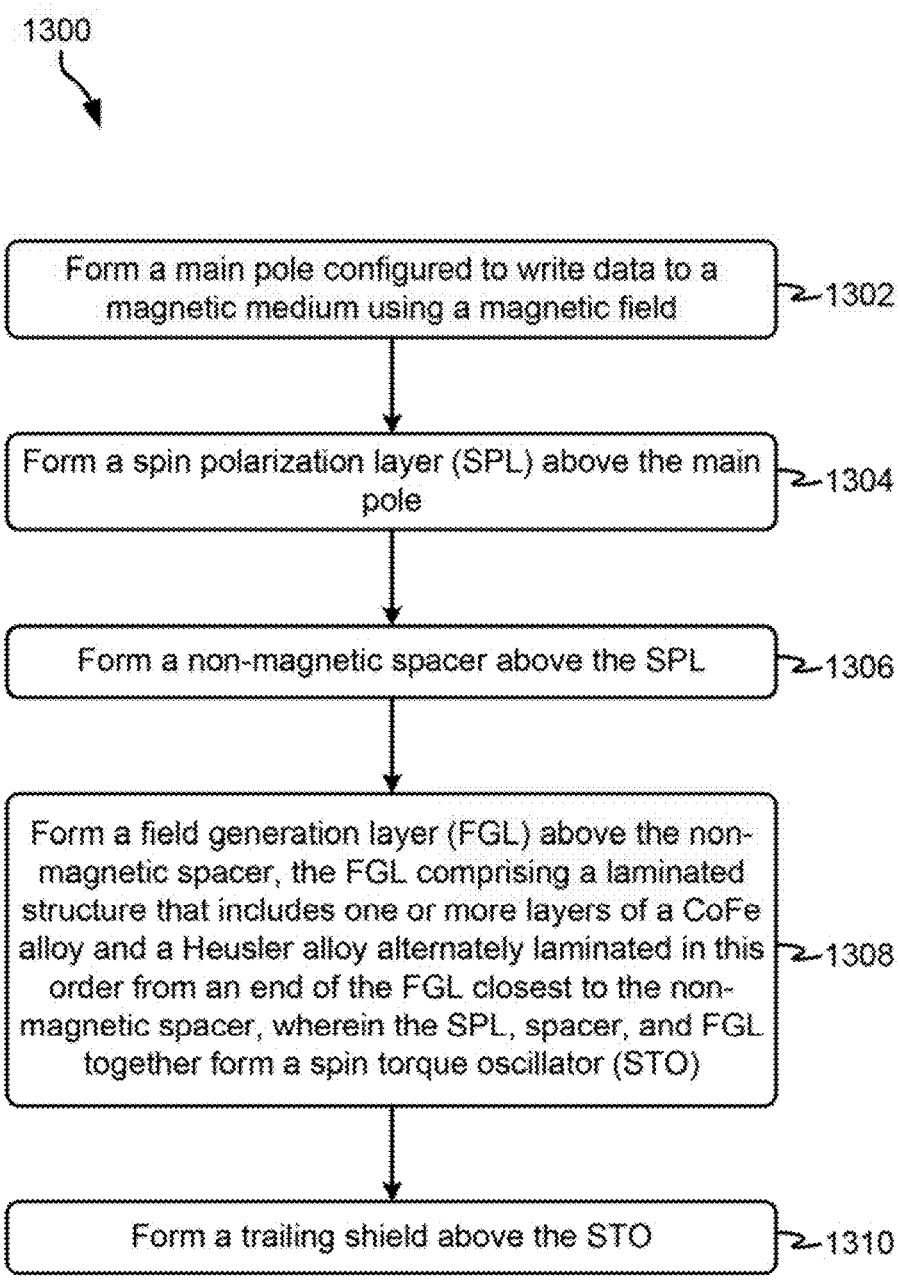
FIG. 13 shows a flowchart of a method for forming a magnetic head, according to one embodiment.

Now referring to FIG. 13, a method 1300 for forming a magnetic head is shown according to one embodiment. The method 1300 may be performed in accordance with the present invention in any of the environments depicted in FIGS. 1-12, among others, in various embodiments. Of course, more or less operations than those specifically described in FIG. 13 may be included in method 1300, as would be understood by one of skill in the art upon reading the present descriptions.

Each of the steps of the method 1300 may be performed by any suitable component of the operating environment. Any suitable formation technique may be used for any of the layers described in FIG. 13, including those specifically described herein and others known in the art such as sputtering, plating, etc. Furthermore, any suitable material may be used for any of the layers described in FIG. 13, including those specifically described herein and others known in the art, such as magnetic materials, non-magnetic materials, insulating materials, etc.

In operation 1302, a main pole configured to write data to a magnetic medium using a magnetic field is formed. A substrate or some other suitable layer may be used to form the main pole on. Furthermore, additional layers may already be present below the formation of the main pole, such as a read sensor and accompanying layers.

In operation 1304, a SPL is formed above and/or in direct contact with the main pole. The SPL may be formed as would be known to one of skill in the art.

In operation 1306, a non-magnetic spacer is formed above and/or in direct contact with the SPL. Again, the non-magnetic spacer may be formed as would be known to one of skill in the art.

In operation 1308, a FGL is formed above the non-magnetic spacer. The FGL comprises a laminated structure that includes one or more alternating layers of a CoFe alloy and a Heusler alloy laminated in this order from an end of the FGL closest to the non-magnetic spacer. Furthermore, the SPL, non-magnetic spacer, and FGL together form a STO (which may have a portion thereof positioned at a media-facing surface of the magnetic head).

In one approach, the Heusler alloy may comprise $Co_2YZ$, wherein Y is selected from a group consisting of Mn, Fe, Cr, and combinations thereof, and wherein Z is selected from a group consisting of Ga, Ge, Al, Si, Sn, Cr, Ti, and combinations thereof. In a specific embodiment, the Heusler alloy is $Co_2MnGe$ while the CoFe alloy is $Co_{50}Fe_{50}$.

In one approach, the laminated structure of the FGL may comprise or consist of a CoFe alloy layer adjacent the non-magnetic spacer and a Heusler alloy layer adjacent the CoFe alloy layer. In this approach, the Heusler alloy may be formed to a thickness of between about 4 nm and about 8 nm, such as about 6 nm, and the CoFe alloy may be formed to a thickness of between about 2 nm and about 6 nm, such as about 4 nm.

In another approach, the laminated structure of the FGL may comprise or consist of a first CoFe alloy layer adjacent the non-magnetic spacer, a Heusler alloy layer adjacent the first CoFe alloy layer, and a second CoFe alloy layer adjacent the Heusler alloy layer. In this approach, the Heusler alloy may be formed to a thickness of between about 2 nm and about 6 nm, such as about 4 nm and the first and second CoFe alloys may each be formed to a thickness of between about 1 nm and about 5 nm, such as about 3 nm.

In another approach, the laminated structure of the FGL may comprise or consist of a first CoFe alloy layer adjacent the non-magnetic spacer, a first Heusler alloy layer adjacent the first CoFe alloy layer, a second CoFe alloy layer adjacent the first Heusler alloy layer, and a second Heusler alloy layer adjacent the second CoFe alloy layer. In this approach, the first and second Heusler alloys may each be formed to a thickness of between about 0.5 nm and about 4 nm, such as about 2 nm and the first and second CoFe alloys may each be formed to a thickness of between about 1 nm and about 5 nm, such as about 3 nm.

In operation 1310, a trailing shield is formed above the STO (possibly at the media-facing surface of the magnetic head and back therefrom, in one approach). The trailing shield may be formed as would be known to one of skill in the art.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic head, comprising:
   a main pole configured to write data to a magnetic medium using a magnetic field;
   a trailing shield positioned on a trailing side of the main pole in a down-track direction; and
   a spin torque oscillator (STO) between the main pole and the trailing shield, wherein the STO comprises a laminated structure comprising:
   a field generation layer (FGL);
   a spin polarization layer (SPL); and
   a non-magnetic spacer positioned between the FGL and the SPL,
   wherein the FGL comprises a laminated structure consisting of a first CoFe alloy layer adjacent the non-magnetic spacer, a Heusler alloy layer adjacent the first CoFe alloy layer, and a second CoFe alloy layer adjacent the Heusler alloy layer, and
   wherein the Heusler alloy layer comprises at least one of: Mn and Cr.

2. The magnetic head as recited in claim 1, wherein the Heusler alloy layer comprises $Co_2YZ$, wherein Y is selected from a group consisting of Mn, Cr, and combinations thereof, and wherein Z is selected from a group consisting of Ga, Ge, Al, Si, Sn, Cr, Ti, and combinations thereof.

3. The magnetic head as recited in claim 1, wherein the Heusler alloy layer comprises $Co_2MnGe$ and at least one of the CoFe alloy layers comprises $Co_{50}Fe_{50}$.

4. The magnetic head as recited in claim 1, wherein the Heusler alloy layer has a thickness in a range from about 2 nm to about 6 nm in the down-track direction and each of the CoFe alloy layers has a thickness in a range from about 1 nm to about 5 nm in the down-track direction.

5. A magnetic data storage system, comprising:
at least one magnetic head as recited in claim 1;
the magnetic medium;
a drive mechanism for passing the magnetic medium over the at least one magnetic head; and
a controller electrically coupled to the at least one magnetic head for controlling operation of the at least one magnetic head.

6. A magnetic head, comprising:
a main pole configured to write data to a magnetic medium using a magnetic field;
a trailing shield positioned on a trailing side of the main pole in a down-track direction; and
a spin torque oscillator (STO) positioned between the main pole and the trailing shield, wherein the STO comprises a laminated structure comprising:
a field generation layer (FGL);
a spin polarization layer (SPL); and
a non-magnetic spacer positioned between the FGL and the SPL,
wherein the FGL comprises a laminated structure consisting of a first CoFe alloy layer adjacent the non-magnetic spacer, a first Heusler alloy layer adjacent the first CoFe alloy layer, a second CoFe alloy layer adjacent the first Heusler alloy layer, and a second Heusler alloy layer adjacent the second CoFe alloy layer, and
wherein the first and second Heusler alloy layers each comprise at least one of: Mn and Cr.

7. The magnetic head as recited in claim 6, wherein at least one of the Heusler alloy layers comprises $Co_2$ MnGe and at least one of the CoFe alloy layers comprises $Co_{50}Fe_{50}$.

8. The magnetic head as recited in claim 6, wherein at least one of the Heusler alloy layers comprises $Co_2YZ$, wherein Y is selected from a group consisting of Mn, Cr, and combinations thereof, and wherein Z is selected from a group consisting of Ga, Ge, Al, Si, Sn, Cr, Ti, and combinations thereof.

9. The magnetic head as recited in claim 6, wherein each of the Heusler alloy layers has a thickness in a range from about 0.5 nm to about 4 nm in the down-track direction and the first and second CoFe alloys each have a thickness in a range from about 1 nm to about 5 nm in the down-track direction.

10. The magnetic head as recited in claim 6, wherein the first and second Heusler alloy each have a thickness of about 2 nm in the down-track direction and the first and second CoFe alloys each have a thickness of about 3 nm in the down-track direction.

11. A magnetic data storage system, comprising:
at least one magnetic head as recited in claim 6;
the magnetic medium;
a drive mechanism for passing the magnetic medium over the at least one magnetic head; and
a controller electrically coupled to the at least one magnetic head for controlling operation of the at least one magnetic head.

12. A method for forming a magnetic head, the method comprising:
forming a main pole configured to write data to a magnetic medium using a magnetic field;
forming a spin polarization layer (SPL) above the main pole;
forming a non-magnetic spacer above the SPL;
forming a field generation layer (FGL) above the non-magnetic spacer, the FGL comprising a laminated structure the laminated structure consisting of either:
a first CoFe alloy layer adjacent the non-magnetic spacer, a Heusler alloy layer adjacent the first CoFe alloy layer, and a second CoFe alloy layer adjacent the Heusler alloy layer; or
the first CoFe alloy layer adjacent the non-magnetic spacer, a first Heusler alloy layer adjacent the first CoFe alloy layer, the second CoFe alloy layer adjacent the first Heusler alloy layer, and a second Heusler alloy layer adjacent the second CoFe alloy layer,
wherein the SPL, non-magnetic spacer, and FGL together form a spin torque oscillator (STO); and
forming a trailing shield above the STO,
wherein the Heusler alloy layer or layers comprise at least one of: Mn and Cr.

13. The method as recited in claim 12, wherein at least one Heusler alloy layer comprises $Co_2$ YZ, wherein Y is selected from a group consisting of Mn, Cr, and combinations thereof, and wherein Z is selected from a group consisting of Ga, Ge, Al, Si, Sn, Cr, Ti, and combinations thereof.

14. The method as recited in claim 12, wherein at least one Heusler alloy layer comprises $Co_2$ MnGe and wherein at least one of the CoFe alloy layers comprises $Co_{50} Fe_{50}$.

15. The method as recited in claim 12, wherein each Heusler alloy layer is formed to a thickness in a range from about 0.5 nm to about 6 nm and wherein each of the CoFe alloy layers is formed to a thickness in a range from about 1 nm to about 5 nm.

16. The method as recited in claim 12, wherein the laminated structure of the FGL consists of the first CoFe alloy layer adjacent the non-magnetic spacer, the Heusler alloy layer adjacent the first CoFe alloy layer, and the second CoFe alloy layer adjacent the Heusler alloy layer.

17. The method as recited in claim 16, wherein the Heusler alloy is formed to a thickness in a range from about 2 nm to about 6 nm and wherein the first and second CoFe alloys are each formed to a thickness in a range from about 1 nm to about 5 nm.

18. The method as recited in claim 12, wherein the laminated structure of the FGL consists of the first CoFe alloy layer adjacent the non-magnetic spacer, the first Heusler alloy layer adjacent the first CoFe alloy layer, the second CoFe alloy layer adjacent the first Heusler alloy layer, and the second Heusler alloy layer adjacent the second CoFe alloy layer.

19. The method as recited in claim 18, wherein the first and second Heusler alloys are each formed to a thickness in a range from about 0.5 nm to about 4 nm and wherein the first and second CoFe alloys are each formed to a thickness in a range from about 1 nm and about 5 nm.

* * * * *

UNITED STATES PATENT AND TRADEMARK OFFICE
CERTIFICATE OF CORRECTION

| | | |
|---|---|---|
| PATENT NO. | : 9,230,597 B2 | |
| APPLICATION NO. | : 14/070401 | |
| DATED | : January 5, 2016 | |
| INVENTOR(S) | : Shimoto et al. | |

It is certified that error appears in the above-identified patent and that said Letters Patent is hereby corrected as shown below:

On the title page item [57]:

line 5 replace "spun" with --spin--;
line 13 replace "baying" with --having--.

In the specification:

col. 1, line 24, replace "hearing" with --bearing--;
col. 8, line 50, replace "way" with --may--;
col. 9, line 26, replace "had" with --head--;
col. 9, line 49, replace "he" with --be--;
col. 9, line 51, replace "field," with --field--.

Signed and Sealed this
Second Day of August, 2016

Michelle K. Lee
*Director of the United States Patent and Trademark Office*